April 20, 1943.   W. A. WEIGHTMAN ET AL   2,317,006
FRUIT JUICE MACHINE
Original Filed Aug. 10, 1937   9 Sheets-Sheet 1

FIG. 1.

INVENTORS
William A. Weightman
Walter Hurleman
BY *J. Calvin Brughs*
ATTORNEY

April 20, 1943. W. A. WEIGHTMAN ET AL 2,317,006
FRUIT JUICE MACHINE
Original Filed Aug. 10, 1937 9 Sheets-Sheet 3

INVENTORS
William A. Weightman
Walter Hurleman
BY J. Calvin Bright
ATTORNEY

April 20, 1943.   W. A. WEIGHTMAN ET AL   2,317,006
FRUIT JUICE MACHINE
Original Filed Aug. 10, 1937   9 Sheets-Sheet 4

FIG. 5

INVENTORS
William A. Weightman
Walter Hurleman.
BY
ATTORNEY

April 20, 1943.   W. A. WEIGHTMAN ET AL   2,317,006
FRUIT JUICE MACHINE
Original Filed Aug. 10, 1937   9 Sheets-Sheet 5

INVENTORS
William A. Weightman
Walter Hurleman
BY J. Calvin Bright
ATTORNEY April 20, 1943. W. A. WEIGHTMAN ET AL 2,317,006
FRUIT JUICE MACHINE
Original Filed Aug. 10, 1937 9 Sheets-Sheet 8

INVENTORS
William A. Weightman
Walter Hurleman.
BY
ATTORNEY

Patented Apr. 20, 1943

2,317,006

UNITED STATES PATENT OFFICE 2,317,006

FRUIT JUICE MACHINE

William A. Weightman and Walter Hurleman, Philadelphia, Pa., assignors, by mesne assignments, to Sealdsweet Sales Association, Tampa, Fla., a corporation of Florida Original application August 10, 1937, Serial No. 158,380. Divided and this application September 15, 1939, Serial No. 295,032

7 Claims. (Cl. 225—21)

The invention relates to a fruit juice extracting and dispensing machine and more particularly to a machine of this class which is entirely automatic in its operation, and adapted to deliver the freshly extracted juice at the outside of a cabinet, housing the machine, a few moments after its extraction.

It is an object of the invention to produce a machine of this class which is reliable in operation, compact so it can be housed in a cabinet of reasonable size, and be readily transportable from place to place, and located conveniently in railroad stations, office buildings, and other places where people congregate, the machine being constructed to be self-serving after it has been charged with fruit, and connected electrically in the usual manner to a wiring system usually provided, so that it requires a minimum of servicing and attention. All that the customer has to do to be served with a drink of freshly extracted juice is to drop a coin in a slot, which sets the machine in operation to deliver a cup of refreshing juice promptly to the customer.

Another object of the invention is the provision of improved mechanisms for carrying out the various operations, such as feeding the fruit, such as an orange, to intermittently rotating hands symmetrically arranged on opposite sides of the machine, cutting the fruit in half, extracting the juice, collecting it in a cup, previously fed to the filling position, and after it is filled delivering it at the outside of the machine to the customer.

These and other objects and advantages, as will become clear as the description proceeds, are attained by the machine and mechanism described in detail in the following specification when read in connection with the accompanying drawings forming a part thereof.

General description

Figure 1:
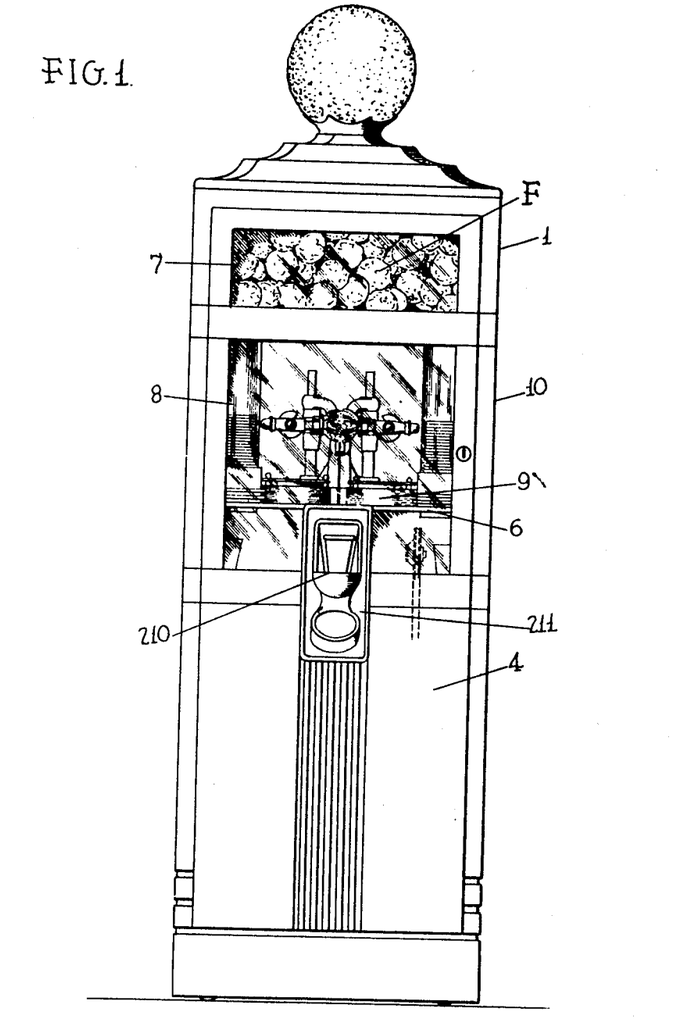
Figure 1 is a front elevation of the cabinet with the machine housed therein.
Figure 2:
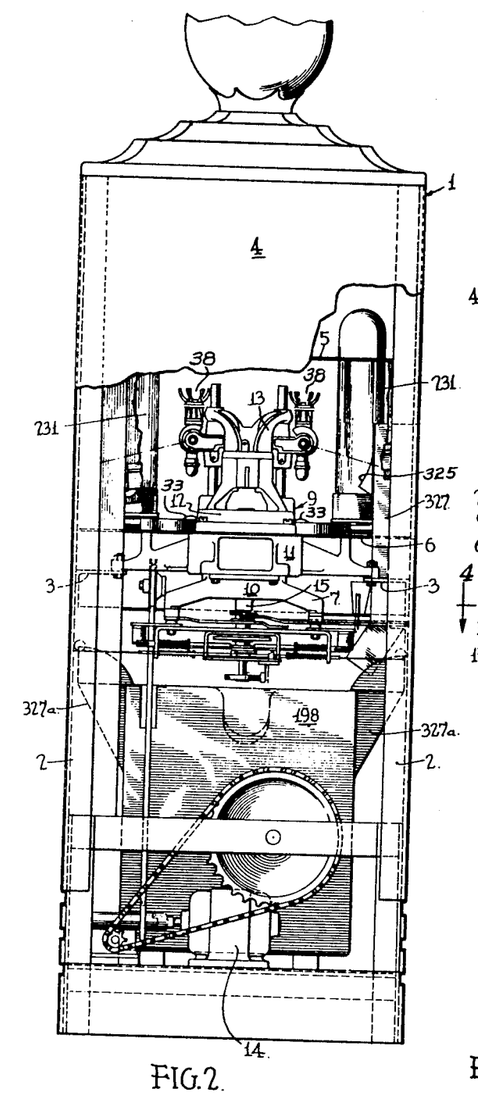
Figure 2 is a rear elevation with the back panel of the cabinet, for the most part, broken away.
Figure 3:
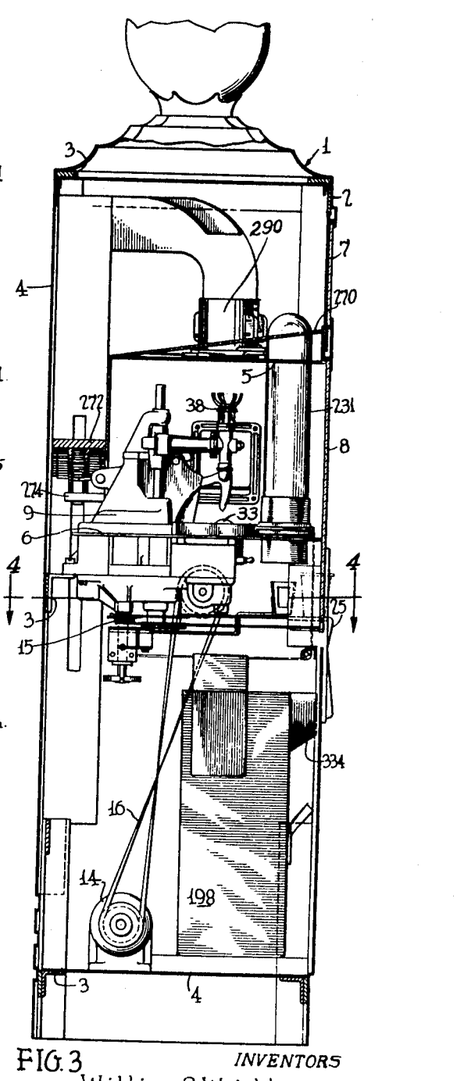
Figure 3 is a side elevation as seen from the right of Figure 2, with the adjacent side panel removed, parts being shown in section.

In general, referring to Figures 1 to 3, the machine is preferably housed in a sheet metal rectangular cabinet 1, built of angle iron framing including vertical corner members 2 and transverse members 3 interconnecting the corner members at top and bottom and at intermediate points, as desired, and to secure the necessary strength and rigidity, the frame members being preferably secured together by welding. The framing 2 and 5 is covered by sheet metal paneling 4, covering the sides, top and bottom to form a box-like casing, the interior of which is accessible for servicing, etc. through doors or removable panels suitably provided but normally kept locked or otherwise secured, so as to prevent access to the interior of the cabinet by unauthorized persons. The permanently fixed portions of the paneling are also preferably rigidly secured, as by welding, to the framing to reinforce and strengthen the structure.

The bottom paneling 4 is preferably supported on the transverse frame members 3 arranged slightly above the bottom of the side walls of the cabinet.

The interior of the cabinet is preferably divided by transverse plate partitions 5 and 6, the partition 5 being adjacent the top and forming with the sides and top a charging chamber or hopper to receive a supply of the fruit F to be processed. At the front of the cabinet a glass panel 7 may be provided to render the fruit in this chamber visible from the outside. Such a panel as 8, is also provided below the partition to expose to view parts of the main unit of the machine.

The partition plate 6 forms the bottom of a chamber housing the upper portion of the main unit 9 of the machine, this main unit comprising a main framing or housing constructed for convenience of manufacture and assembly of a superposed series of castings 10, 11, 12, and 13, bolted together in the assembly of the machine. The main casting 11 extends from side to side of the cabinet, see Figure 2, and rests on top of the transverse intermediate members 3 of the cabinet framing and is secured thereto, as by bolts. The main casting 11 is located just below the partition plate 6, which is intervened between the top of this casting and the casting 12 above it and is secured in place therebetween by bolts securing the castings together.

The chamber below the partition 6 is, by reference to Figures 2 and 3, seen to house in its upper portion a large part of the main unit 9 of the machine, and in its lower part, the motor 14 for driving the machine, and a large refuse receptacle adapted to receive the skins, seeds, etc., which are guided to it from the machine above, as will be pointed out hereinafter.

The main unit of the machine, as hereinbefore described, carries most of the operating mechanisms of the machine, including (A) the hands and their operating mechanism for receiving the fruit from the supply chamber or hopper, then transporting it to the knife, then to the reamers, then carrying the skins to the discharging position, and finally returning to the receiving position; (B) the knife and its operating mechanism; (C) the reamers and the juice collecting mechanism; (D) the skin ejector mechanism; (E) the cup dispensers; (F) the empty cup transfer; (G) the filled cup delivery mechanism; and (H) the refuse (seeds and pulp) separation and disposal mechanism.

These mechanisms are all operated by the motor 14 and their movements are controlled and timed by a vertical cam shaft 15, the motor being set in operation by a relay in turn controlled by a coin controlled device (not shown) operated by dropping a suitable coin in a slot, see Figure 1, provided on the front of the cabinet. With the start of the motor, the various operations are carried out during one complete cycle or rotation of the cam shaft 15, when the machine will be automatically stopped, to be started only by the insertion of another coin in the slot when the cycle will be repeated. During each cycle the juice will be freshly extracted from one fruit and delivered outside the cabinet to the customer.

The drive from the motor 14 to the reamers 33 and cam shaft 15, and the manner in which the latter controls and times the movements of the hands 38 which receive the fruit from the hopper, the cutting of the fruit, the juice extracting and collecting mechanism, and the feeding of the fruit from the hopper are all described in detail in the parent application, Serial No. 158,380, filed August 10, 1937 (now Patent No. 2,274,020), of which this application is a division. Except as these cooperate with the parts now to be described in detail, no further description thereof is believed necessary herein. Suffice it to say that at each cycle of the machine, the juice from one fruit is delivered to a vertically extending spout 159 through which the extracted juice passes to a cup positioned therebelow.

The push-out of the filled cup to the outside of the machine cabinet and the refuse disposal, the gate and its operating mechanism, and the empty cup release and transfer mechanism are the principal features retained and claimed in this application and will now be described in detail.

The filled cup push-out and refuse disposal mechanism

Figures 18, 20:
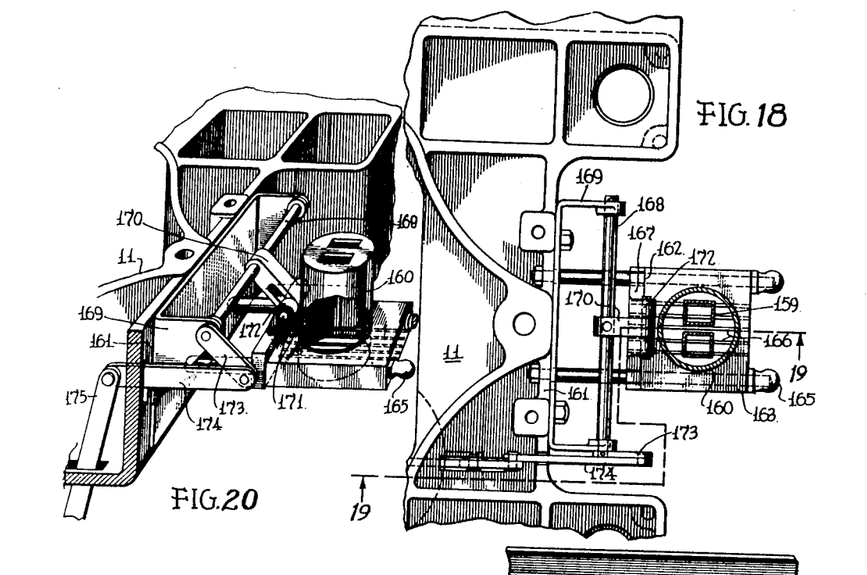
Figure 18 is a plan view of the detail, parts being in section, taken along the line 18—18 of Figure 11 showing the strainer and its immediately associated operating mechanism.
Figure 20 is a perspective view of most of the parts shown in Figures 18 and 19, parts being broken away.

When the extracted juice leaves the spout 159, it passes into an inverted cup-shaped strainer receptacle 160, which catches the seeds and any pulp mixed with the juice. The strainer receptacle and the parts associated therewith, as is clearly shown in the perspective view of Figure 20 and the plan view of Figure 18, are supported from the front wall 161 of the main frame casting 11, through which the machine is supported in the cabinet. The strainer receptacle itself is directly supported by the rods shouldered at 162, see Figure 18, secured to the front wall of the casting and projecting forwardly therefrom. The platform 163 is clamped against the shoulders 162 on the rods by cap nuts 165 screwed on their outer reduced ends.

As shown in Figures 11 and 18 to 20, the bottom of the strainer receptacle is open to allow the juice to pass through it into the cup C. To prevent the passage of the seeds and pulp, a number of closely spaced openings all parallel surround a number of closely spaced parallel pins 166 in the platform 163 and the strainer receptacle 160, the pins being secured at their inner ends to a cross bar 167 mounted for sliding movement upon the rods 164.

Figure 19:
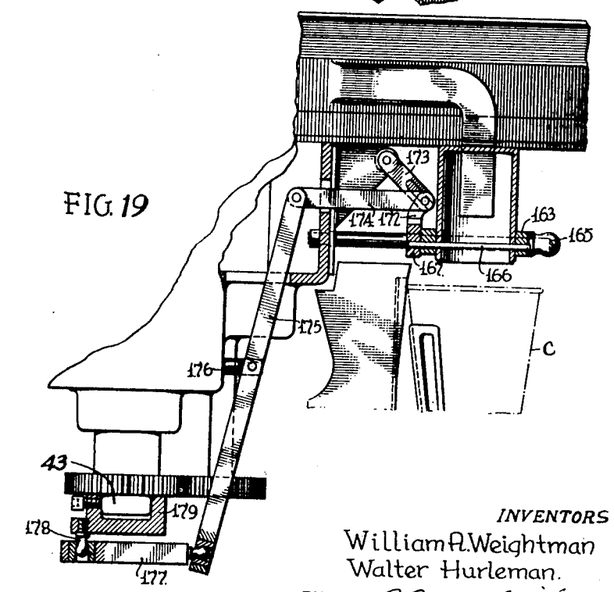
Figure 19 is a vertical sectional view through the strainer and its operating mechanism, parts associated therewith being shown in elevation, the section being taken approximately on the line indicated at 19—19 of Figure 18.
Figure 21:
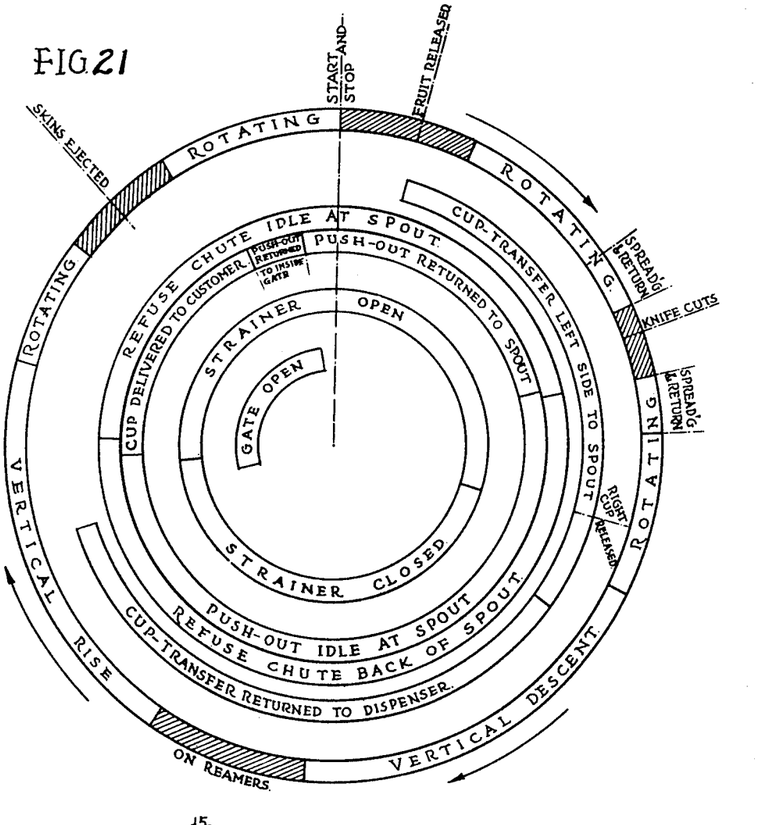
Figure 21 is a timing chart showing diagrammatically the movements of the hands, the cup transfer, the cup push-out and refuse chute, the strainer rods and the gate and their relations during one operative cycle of the machine, the starting and stopping indicated by a vertical line from the center to the top of the chart.

The means for imparting such movement to the cross bar and the pins connected therewith is best shown in Figures 18 to 20, and comprises a rock shaft 168, borne by the spaced ears of a bracket 169 bolted to the wall 161 of the casting 11. This rock shaft carries centrally between the ears of the bracket a forked arm 170, which engages a pin 171 mounted between spaced upwardly projecting ears 172 on the cross bar 167. Another arm 173 is secured to one end of the rock shaft 168 and connected by a link 174 to a lever 175, which is pivoted intermediate its ends on a pin passing through the slotted end of a stud 176 secured in the main casting 11. The lower end of this lever is connected by a ball joint to a link 177, which is in turn connected by another ball joint to a crank pin 178 to a cup 179 telescoped with the projecting lower end of the left hand operating shaft 43 and secured to it by a lock screw.

Figures 11, 17:
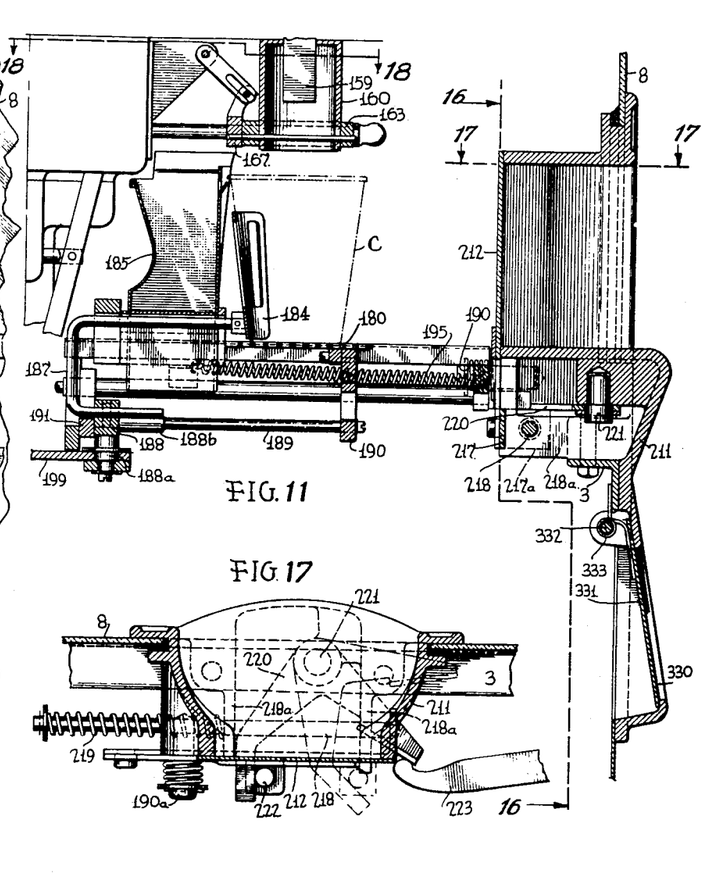
Figure 11 is an enlarged fragmentary vertical sectional view through the gate at the front of the machine and the cup push-out mechanism arranged adjacent thereto, the section being taken approximately on the line 11—11 indicated in Figures 4 and 16, this view showing the parts in the filling position.
Figure 17 is a horizontal sectional plan view through the gate, the section being taken along the line 17—17 of Figure 11.

By this construction it will be evident that, as the shaft rotates, the cross bar carrying the strainer pins 166 will be reciprocated to withdraw the strainer pins from the strainer cup at each revolution of the shaft, and to return them again to operative position shown in Figure 11, the operation being timed to have the strainer closed during the juice extraction and open when it is desired to release the refuse from the strainer cup.

The cup C, during the filling operation rests on a cup receiving platform in the form of a perforated plate 180 which is longitudinally slidable on a frame 181 bolted to a plate 182 extending across the front of the cabinet 10 at about the level of the cup receiving platform 180 and secured to the side walls of the cabinet, a longitudinal way being provided in the plate to permit the sliding movement of the platform. The frame 181 carries two spaced parallel guide rods 183 upon which the platform is guided in its reciprocatory motion.

Figure 12:
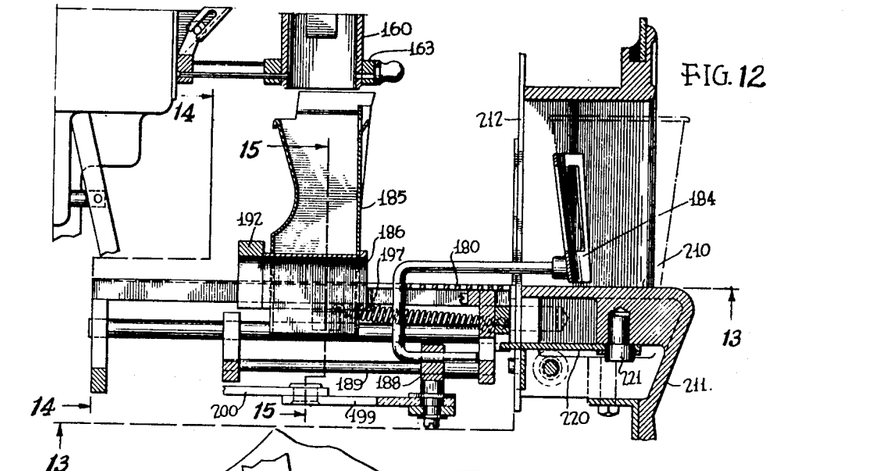
Figure 12 is a similar view showing the parts in the push-out position.
Figure 14:
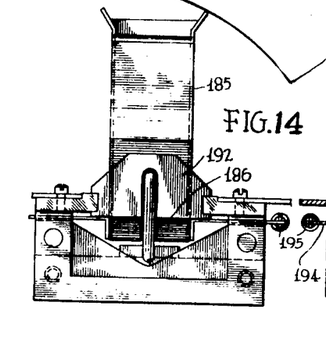
Figure 14 is a rear elevation as the parts would appear if viewed along the line 14—14 of Figure 12.
Figure 15:
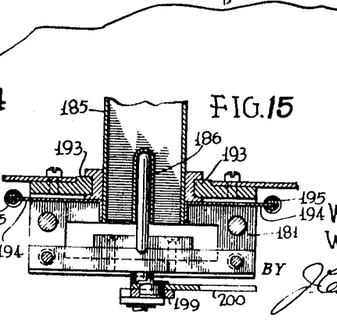
Figure 15 is a fragmentary vertical transverse sectional view taken substantially along the line 15—15 of Figure 12 through the refuse chute.

Referring now to Figure 11, the curved cup push-out plate 184 is normally in engagement with the rear wall of the cup on the receiving platform 180 and immediately in back of the push-out plate there is mounted a refuse chute 185, this refuse chute having a passageway 186 through its lower portion for permitting the passage of the U-shaped rod 187 rigidly connected to the back of the push-out plate, see also Figures 12, 14, and 15. The lower arm of the U of this rod is clamped to a sliding carrier 188 mounted to slide on the guiding rods 189, supported in the brackets 190 and 191, depending from and guided by the guide rods 183 and movable with the movable receiving platform 180.

Figure 13:
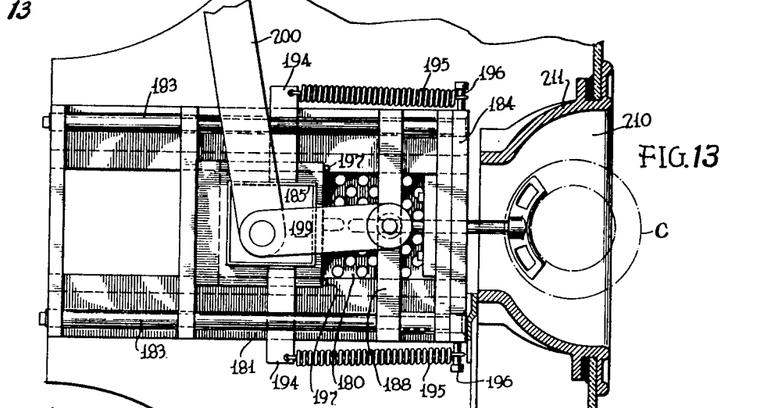
Figure 13 is a bottom plan view, parts being in section, of the parts shown in Figure 12, the view being seen as it would appear if the section were taken along the line 13—13 of Figure 12.

The refuse chute 185 is mounted in a carrier 192 guided in the ways 193 on the frame 181, also for sliding movement. As is best seen in Figures 13 and 15, the carrier 192 has laterally projecting arms 194, the outer ends of which are connected by coiled tension springs 195 to laterally projecting pins 196 secured to the forward end of the frame 181. When the parts are in position shown in Figure 11 the springs are under tension, and cause the refuse chute to follow the movement of the cup push-out plate 184 in the forward movement of the cup until the carrier 192 strikes the stop pins 197, see Figures 12 and 13, projecting from the lower faces of the ways guiding the carrier. In this position the chute is directly under the strainer receptacle 160 and the strainer pins 166 are withdrawn and permit the refuse to drop down through the chute into a large refuse receptacle 198, see Figures 2 and 3, in the bottom of the cabinet.

The mechanism for operating the cup push-out and the refuse chute, whose movements are controlled by the cup push-out is best understood by reference to Figures 4, 5, 7, 11, 12, and 13. It comprises a link 199 connected to a downwardly projecting pin 188a on the sliding carrier 188, this link being pivotally connected to the free end of the lever 200, pivoted at its opposite end on a pin 201, secured to a bracket fastened to the side of the cabinet. Some distance inwardly from its pivoted end the lever 200 is connected by a link 202 to the outer end of a lever 203, which is pivoted near the center by the pivot pin 204 secured in the lower casting 10 bolted to the underside of the main casting 11 of the machine frame. The end of this lever 203 opposite the link 202 carries a cam follower 205 which bears against a cam 207 secured to a sleeve 206 keyed to the main cam shaft 15. To force the cam follower against the cam and to return the cup push-out, the cup receiving platform, and the refuse chute from the outer position indicated in Figures 12, 13 and 7, to their inner position indicated in Figures 4, and 11, against the tension of the coiled springs 195, there is provided a series of six coiled springs 208, see also Figure 5, secured at one end to the right hand vertical corner frame member 2 of the cabinet and at the opposite end to a bar 209 secured to the front face of the lever 203 near its connection with the link 202. The tension of the springs 208 much exceeds the tension of the springs 188 and the effort required to return the parts from their outer to their inner positions.

From the immediately preceding description and the figures referred to it will be seen that the actuating cam 207, has a rather abrupt rise tapering off less abruptly causing the cup push-out plate 184 to be moved forwardly quickly but with a slower motion as it approaches the forward position shown in Figure 12 the refuse chute carrier following it under the action of the springs 195 until it strikes the stop pins 197. The carrier is guided on the rods 189 through forwardly projecting sleeves 188b connected to it, and these sleeves, in the final outward movement of the carrier 188 engage the forward depending bracket 190 and move the carrier and bracket outwardly, the final outward movement of these parts being cushioned, by a spring buffer 190a, see Figures 11 and 17, carried by a casting 211 secured in its margins to an opening in the front wall paneling of the cabinet and to a transverse frame member 3 thereof.

After the cup push-out has reached its outer position, see Figure 12, the cam follower reaches a sudden drop off in the cam 207, resulting in a sudden withdrawal of the push-out plate 184 within the cabinet, after which the carrier 188 strikes the depending bracket 191 movable with the receiving platform and the latter engages the front of the refuse chute carrier 192, and the push-out plate 184, receiving platform 180, and refuse chute 185 all move together to their inner position shown in Figure 11.

By reference to Figures 12 and 13, it will be seen that the cup C is delivered on a platform 210 outside the cabinet through an opening which flares outwardly and permits the cup to be readily grasped by the hand of the customer. This platform and opening are provided in the casting 211, secured centrally to the front wall of the cabinet in the manner described. The glass panel 8 surrounds the upper portion of this casting, see Figure 1, its margin extends into a channel in the adjacent margin of the casting and is yieldingly locked therein by a rubber or other yielding filler as shown in Figures 11 to 13.

The gate and its operating mechanism

Referring now to Figures 11, 12, 16, and 17, it will be seen that the rear face of the upper portion of the casting 211, around the opening is machined to a flat plane surface and a gate 212 normally closes tightly against this machined surface. The gate 212 is mounted on one arm of a lever 213 integrally secured thereto, this lever being pivoted on the pin 214 projecting from the rear surface of the casting. The arm of the lever remote from the gate is provided with an angular slot 215 into which projects a pin 216 on the gate operating slide 217. When this slide is reciprocated the gate will be swung from the full line closed position shown in Figure 16 to the dotted line open position and vice versa. The slide 217 is guided in ways on the casting 211 and has secured to it through a lateral projection 217a thereon for movement therewith a guide rod 218 suitably guided in transverse holes provided therefor in spaced vertical inwardly projecting walls 218a on the casting, and between a washer secured to the projecting end of the guide rod and the adjacent wall 218a of the casting, see Figure 17, the rod is surrounded by a coil spring 219, this coil spring acting normally to swing the gate to its closed position.

Figure 7:
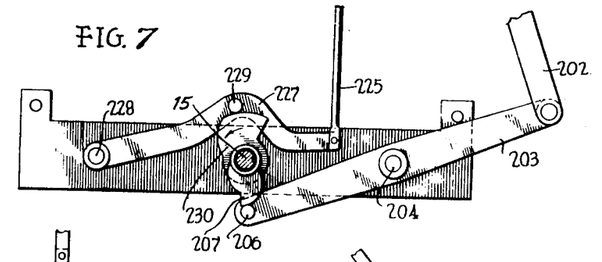
Figure 7 is a fragmentary sectional plan view taken approximately on the line 7—7 of Figure 5 showing the cup push-out cam and associated parts and the gate operating cam and its associated parts.

The slide is operated to open and close the gate by the mechanism shown in Figures 4, 5, 11, 12 and 17. A bell crank lever 220 pivoted on the stud 221 secured in and projecting from the casting 211, has one arm bearing against a vertically projecting stud 222, on a lateral projection from the top of the slide 217. The opposite arm of the lever is formed with a flat face which is engaged by the curved end of a lever 223, pivoted on a vertical pivot 224 on a bracket secured to the side of the cabinet, see Figure 4. The lever 223 is engaged near its free end by a push rod 225 guided by bracket 226 projecting inwardly from the front wall of the cabinet. The end of the push rod is preferably slotted and receives the lever within the slot. At its rear end the push rod is pivotally connected to the free end of a lever 227 which has a bend in it where it passes around the cam shaft 15 and is pivoted on the opposite side of the cam shaft from its free end on the pivot 228, carried by the casting 10, see Figure 5. This lever carries a vertically projecting cam follower pin 229 which is held against the gate operating cam 230 on the sleeve 206 keyed to the cam shaft 15 under the action of the spring 219. As shown in Figures 25 and 28 this cam is so shaped as to have a dwell of considerable duration after the follower has reached the high point of the cam and during this time the gate will be held open. This is to insure that the gate will be held open a sufficient length of time to permit the cup and its push-out to pass through the gate and for the push-out to again return, within the cabinet. As shown in Figure 7, the push-out cam 207 and the gate operating cam 230 are in the position in which the gate is open and the cup push-out is almost at its outer position. From the relative position of the cams on the cam shaft, it is evident that the gate is held open until the cup push-out has returned within the cabinet after the cam follower 206 has dropped off the high point of the cup push-out cam 207.

The empty cup release and transfer mechanism

The empty cup feed mechanism is best disclosed in Figures 2, 3, 4, 5, 8 and 9. In order to avoid an undue height in the cup dispenser which would increase the height of the cabinet, the cup dispensers 231 are preferably arranged in duplicate on opposite sides of the front portion of the cabinet and mounted in the transverse plate partition 6 above the plate 182 extending across the cabinet at the height of the perforated platform receiving the cup during the filling operation. As shown they extend at the top through openings in the transverse plate 5. These dispensers are of well known construction adapted to drop one cup at a time to the plate 182 upon each actuation of a lever 232 projecting laterally from each of their lower ends. Since only one cup is required during one cycle of the machine, which is measured by one rotation of the cam shaft 15, the mechanism for releasing the cups from the dispensers is arranged to actuate the dispenser levers alternately for each succeeding cycle of the machine. A convenient means for accomplishing the process is the cam 233 mounted on the sleeve 234 surrounding and rotating on the lower end of the cam shaft 15, see Figure 5.

Figure 5:
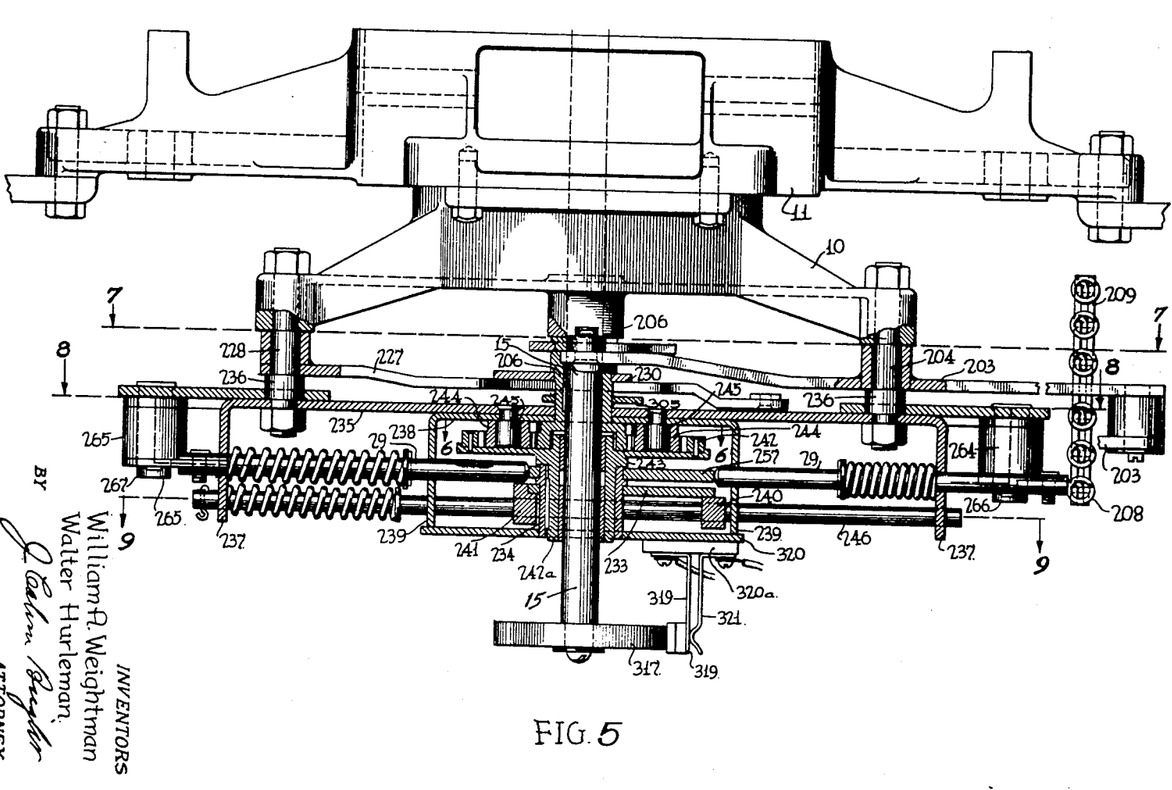
Figure 5 is an enlarged vertical transverse sectional view taken approximately on the line 5—5 of Figure 4, parts being shown in elevation.

The mechanism for actuating the cup release from the dispensers and the cup transfer mechanism for transferring the cup from the dispensers to the filling position is carried by a plate 235 secured against collars 236 on the pivot bolts 204 and 228 by nuts screwing on the ends of these bolts as shown in Figure 5. The ends of this plate have downturned portions 237, and a short plate 238 secured centrally to the plate 235 has similar downturned ends 239. These downturned ends 237 and 239 serve as supporting and guiding means for the actuating mechanism to be presently described.

Since the cam 233 has but one high point from which there is a sudden drop off, and the cup dispensers are to be operated alternately, the cam followers 240 and 241 are arranged at diametrically opposite points of the cam and the cam 233 is driven at half the speed of the cam shaft 15.

Figure 6:
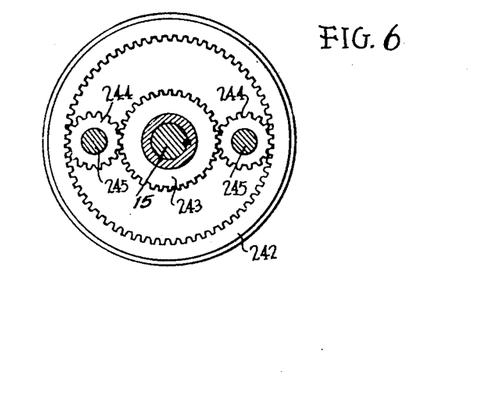
Figure 6 is a detail sectional plan view of the planetary gear transmission from the main cam shaft to a sleeve shaft concentric therewith, the section being taken substantially along the line 6—6 of Figure 5.

This reduced speed drive is conveniently obtained through the planetary gearing shown in Figures 5 and 6. In these figures the large internal gear 242 is carried by an elongated hub portion 242a to which the cam sleeve 234 is splined while the sun gear 243 is carried by a sleeve keyed to the cam shaft 15, this sleeve also carrying the cams 207 and 230, and the planetary gears 244 meshing with the gears 242 and 245 are fixedly mounted on stud shafts 245 secured to the overlapping plates 235 and 238 and locking these plates together as shown in Figure 26.

Figures 8, 9:
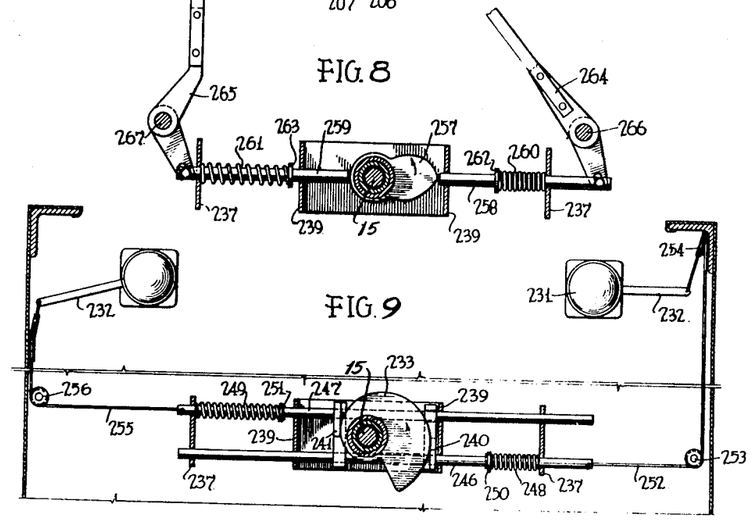
Figure 8 is a horizontal transverse sectional view taken substantially on the line 8—8 of Figure 5 showing the cup transfer cam and its associated parts.
Figure 9 is a horizontal transverse sectional view taken substantially on the line 9—9 of Figure 5 showing the cup release mechanism.
Figure 10:
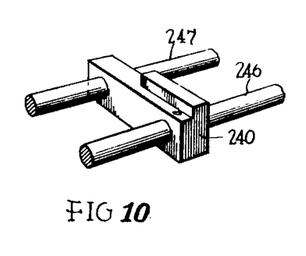
Figure 10 is a detail perspective view of the right hand cam follower and its associated rods shown in Figure 9.

The cam followers 240 and 241 are fixedly mounted, respectively, on the parallel sliding rods 246 and 247 which are guided for sliding movement on the downturned ends of plates 235 and 238. By reference to Figures 5 and 9, showing the cam follower 240 in detail, it will be seen that each cam follower comprises an upwardly extending lug forming part of a transverse bar fixed to the rod directly beneath the lug and guided for sliding movement on the parallel rod. As the followers ride up over the cam, springs 248 and 249 surrounding, respectively, the rods 246 and 247 and bearing, respectively, at their inner ends, against collars 250 and 251 on said rods, and bearing, respectively, at their outer ends, against the right and left downturned ends of the plate 237, are successively compressed and released, when the respective cam followers drop off the high point of the cam 233. The rod 246 is connected to the operating lever 232 of the right hand cup dispenser 231 by a wire or other flexible connection 252 passing over pulleys 253 and 254 mounted at the right hand side of the cabinet. Similarly, the rod 247 is connected by a wire or other flexible connection 255 passing around a pulley 256 mounted on the left hand side of the cabinet to a connection with the lever 252 associated with the left hand dispenser. The terms right and left are here used with reference to Figure 9 and not with reference to the front of the machine.

From this description it will be seen that one of the springs 248 and 249 will be fully compressed each half revolution of the cam, permitting its associated cup dispenser lever 232, to return to normal position. When the cam follower passes beyond the drop off point of the cam, the cup dispenser associated therewith is operated by its spring to release the cup. Since the cam makes but half a revolution for each revolution of the main cam shaft 15, a cup will be released from one of the dispensers at each revolution of the main cam shaft 15, which release will take place alternately from the two dispensers.

In view of the alternate release of the cups from the dispensers, the cup transfer mechanism for moving the cup from a position beneath the dispensers to the central filling station over the perforated platform 180 is similarly alternately operative. This mechanism is most clearly shown in Figures 4, 5, and 8. It comprises a cam 257 mounted on the sleeve 234 to rotate at half the speed of the main shaft 15. This cam operates upon rods 258 and 259 which are slidably mounted in the downwardly turned ends 237 and 239 of the plates 235 and 238. Springs 260 and 261 encircle, respectively, the rods 258 and 259. The inner ends of these springs bear respectively against collars 262 and 263 on the rods 258 and 259 while their outer ends bear respectively against the right and left hand downturned ends 237 of the plate 235. The outer ends of these rods 258 and 259 are connected by a pin and slot connection to the short arms of the respective cup transfer levers 264 and 265. These levers are pivoted, respectively, on pin 266 and 267 mounted in the lateral extensions of the plate 235 as shown in Figure 5. The long arms of the levers 264 are offset upwardly from their short arms so as to lie and swing on top of the plate 182 upon which the cups are deposited when released from the dispensers, as shown in Figure 25. The free ends of the transfer levers 264 and 265 are formed respectively with pockets 268 and 269 open on their inner sides and conforming generally to the shape of the cup C.

By reference to Figure 8, it will be obvious that the cup transfer levers will be alternately actuated by the cam 257 to transfer a cup from beneath the dispensers to the filling position, and that the springs associated with the respective levers will return them to their position beneath the dispensers to receive the cup therefrom.

In order to bring the machine to a stop after a cycle has been completed, a suitable switch is placed in the motor circuit, this switch being preferably associated with the main cam shaft 15 making one revolution during a cycle. To this end, this cam shaft has a disc 317 (Figure 5) keyed to it, this disc being formed at one point of the circumference with a V-shaped notch 318, see diagram in Figures 5 and 22. Against the periphery of this disc a spring contact 319 is pressed, this contact is mounted on a plate 320 secured to the downward projections of plate 238 and forming a bearing for the lower end of the gear hub 242a and the cam sleeve keyed to it. A second spring contact 321, also mounted on the plate 320, of the switch normally bears against the back of the contact 219 to close the switch. When the contact 319 comes opposite the notch 318 in the disc, it springs inwardly into the notch and breaks its contact with contact 321, thus opening the motor circuit and stopping the motor. The contacts are insulated from each other and the plate 320 by a suitable insulating pad 320a, and contact 319 engages disc 317 with a V-shaped insulating block.

The momentum of the cam shaft 15 carries it around a small fraction of a revolution, after the motor ceases to drive it, and during this overrun the contact 319 moves out of the notch 318 and the contacts 319 and 321 are again pressed together to close the switch. This will not start the motor a second time since provision is made, as will hereinafter be described, to break the motor circuit at a second switch as soon as the switch just described is opened by the dropping of the V-shaped block of contact into the notch.

*The Operation of the machine*

From the foregoing description, the operation of the machine is perhaps best understood by reference to the timing chart shown on Figure 50 and the wiring diagram shown in Figure 51. The machine is so designed as to complete its cycle, as indicated by the timing chart, in one rotation of the cam shaft 15. The dropping of a coin into a slot provided at the front of the cabinet starts the machine by the closing of a switch 322 which is closed momentarily by any suitable coin controlled mechanism, not shown. The closing of this switch completes the circuit to the opposite sides of the line to which the machine may be connected by plugging into the usual house wiring circuit or any other suitable source of electric energy, and the closing of this circuit operates a relay 323 to close the motor circuit and at the same time energizes the solenoid 32 to withdraw the stop pin 32a, thus completing the drive from the motor to the cam shaft 15 as described in the parent application.

In the timing chart shown in Figure 50, the top of the figure, as indicated, represents the starting and stopping position, the outer circle indicates the movement of the hands from start to stop and similarly, the next circle represents the movements of the cup transfer. The third and double circle represents the movements of the cup push-out and refuse chute, while the fourth represents the strainer pin movements and the fifth indicates the time during which the gate is open.

While the cam shaft 15 moves from the start to stop position in the clockwise direction, the hands are first stationary as indicated by the shaded area, and dwell in their vertical position. During this time the fruit is released from the chute 290 at about the point indicated by the dot and dash dine in Figure 50 and drops into and is grasped by the right hand 38, under it.

The hands then start their rotary movement, moving from the vertical position as shown in Fig. 2 to the horizontal position (see Fig. 1) where both hands grip the fruit. During the latter part of this rotary movement, the hands are spread apart and again brought together as the rotary movement is completed. During the dwell ensuing, as shown by the timing chart, the knife is released to the cutting action at about the point indicated by the dot and dash line and the fruit is severed into two parts, one part grasped by each hand. After this operation is completed the hands are again rotated, each now grasping its part of the fruit until they reach the vertical downwardly projecting position.

At this point they dwell in their rotary motion as indicated by the timing chart for almost half a revolution of the cam shaft, for it is during this period that they move vertically down on the reamers, dwell in their lowest position for a short length of time and then rise again. During this relative approach movement, the juice is extracted from the fruit.

Figure 4:
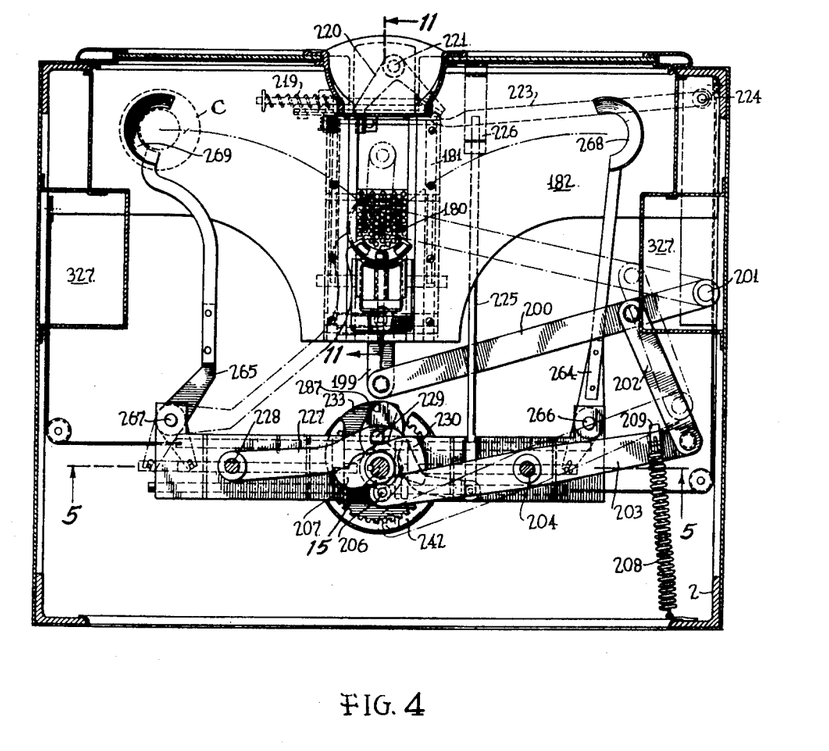
Figure 4 is a transverse horizontal sectional plan view through the machine cabinet taken approximately on the line 4—4 of Figure 3 showing the cup push-out and transfer and the gate operating mechanism.

The hands are then again rotated some distance, and they again dwell in such position for a short period as indicated in the timing chart, during which period the ejection of the skins takes place. At this point it might be mentioned that the skins are ejected through openings, as 325, into the chutes 327 (Figs. 2 and 4). They drop down from this point through chutes 327, see Figure 4, into the lower part of the cabinet where they strike the inclined lateral chutes 327a, (Fig. 2) on the main refuse receptacle 198 in the bottom of the cabinet and are guided thereinto.

After the ejection and the dwell during which it takes place the hands are again rotated to the vertical position shown in Fig. 2 and the machine is stopped.

As indicated by the timing chart, by comparing the second circle with the one just described, it will be seen that the cup transfer from the cup dispenser 231 to the filling position is completed before the hands have descended upon the reamers and the juice is being extracted. This operation takes place under the action of the cup transfer cam 257 and the parts associated therewith. During the further vertical descent of the hands to extract the juice and during a part of the vertical rise thereof, the cup transfer lever is again returned to the position under the cup dispenser to receive another cup.

The cup push-out and refuse chute movements are indicated by the third circle of the timing diagram and comparing this with the first circle it will be seen that at the start of the cycle the refuse chute 185 is still in its forward position under the open strainer cup and the cup push-out is returned to its rearward position but does not reach this position until sometime after the start of the machine. By reference to the second circle it will be seen that it completes its movement to the rearward position behind the filling position before the cup transfer has advanced the empty cup to this position. The cup push-out remains stationary in this position as shown by the diagram during the vertical descent of the hands to extract the juice and during the greatest portion of their vertical rise. During the latter part of the vertical rise and the subsequent rotation of the hands to the skin ejection position and during the dwell in that position, the cup delivery moves forward to deliver the cup to the outside of the machine and at the same time the refuse chute moves forward under the strainer housing. During the last part of the machine cycle the cup delivery is returned to the rear of the gate but does not complete its rearward movement, as above pointed out, until the next cycle of the machine.

Referring to the timing diagram, the fourth circle indicates the timing of the movements of the strainer opening and closing pins. These pins are actuated by a crank pin 178 on the lower end of one of the intermittently rotated hand-rotating shafts 43, which makes one complete revolution at intervals during the cycle of the machine. By reference to the outer circle of the timing diagram, it will be seen that shaft 43 is stationary from the start of the vertical descent of the hands to the end of their vertical ascent and during this period the strainer pins as indicated by the fourth circle, are also stationary. From the starting point of the machine to the beginning of the vertical descent of the hands to the strainer pins are moved by the rotation of the shaft 43 from their rearward open position to their forward closed position so that they are in position closing the bottom of the strainer housing during the period of the juice extraction and for some time thereafter. It is only when the hands begin to rotate to the skin ejecting position that the strainer rods are fully withdrawn to permit the refuse collected thereon to drop down through the refuse chute just prior to the completion of the machine cycle.

As shown by the fifth circle in the timing diagram by comparison with the second circle, the gate 212 is in the open position during the cup transfer to the outside of the mahine and some time thereafter to permit the cup push-out mechanism to move inwardly far enough to clear the gate. During the remainder of the cycle the gate remains closed, being in closed position at the start and stopping of the machine.

The reamers 33 and the juice-collecting housings surrounding them are of course continuously driven at high speed during the operation of the motor i. e. during the complete cycle.

Immediately after the return of the cup transfer lever to its position under its associated cup dispenser, the associated cup release actuated by the cam 233 and its associated spring is operated to release the cup from the associated dispenser. By reference to the second circle in the timing diagram, this release takes place approximately at the point indicated by the dot and dash line through the second circle at the point indicated.

From the foregoing description of the operation, it will be seen that the movements of most of the mechanisms are controlled either directly or indirectly from the main cam shaft 15.

Figure 22:
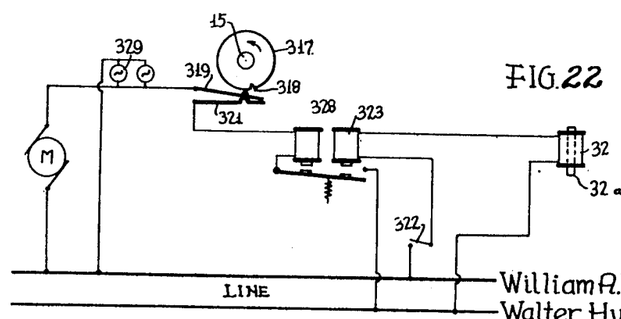
Figure 22 is a diagrammatic representation of a wiring system which may be employed.

As before pointed out the machine is stopped by the opening of the switch 319—321 by the notch 318 in the disc 317 on the cam shaft as shown in the wiring diagram, see Figures 5 and 22. The opening of this circuit at this point deenergizes the lock up relay 328 in the motor circuit which normally holds the motor circuit, closed temporarily by the relay 323 in the coin controlled circuit, closed at this point. Since the coin control circuit remains closed but momentarily the relay 323 operates merely to close the switch of the motor circuit, the lock up relay 328 then maintaining it closed until it is deenergized by the opening of the cam shaft control switch. As shown in the wiring diagram several lamps may be arranged as 329 in the motor circuit, these lamps being arranged at suitable locations in the cabinet to light up parts visible through the glass panel 8 at the front of the cabinet during the operation of the machine.

Figure 16:
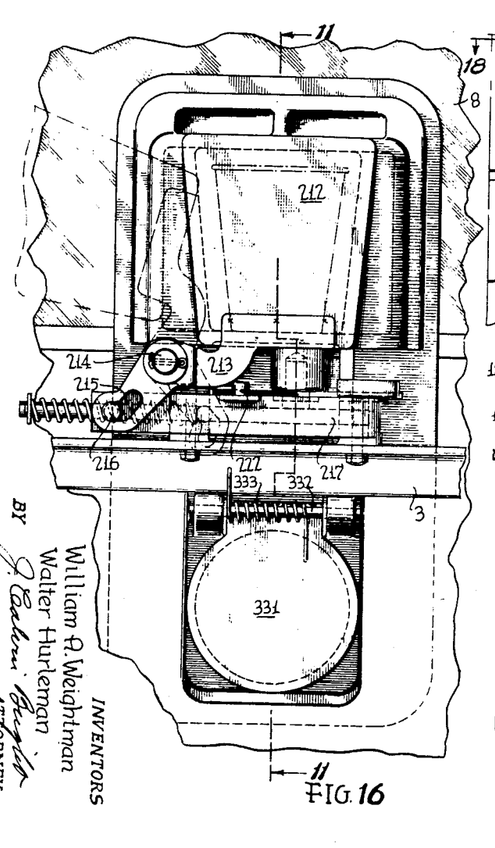
Figure 16 is a rear elevation of the gate parts as seen looking in the direction of the arrows shown at the end of the line 16—16 of Figure 11.

The used cup may be disposed of by dropping it through an opening 330, shown in Figures 11 and 16, provided in the bottom of the casting wall 211 through which the cup push-out opening extends. This opening is normally closed by a cover 331 hinged at the top on a pin 332 and pressed to its seat closing the opening by a spring 333 surrounding the pin and having its ends bearing respectively, against a transverse frame 3 supporting the casting and against the cover. A forwardly projecting spout 334 on the refuse container 198 and arranged just below this opening 330 guides the used cup into the refuse container in the bottom of the cabinet.

While the machine has been described herein as a full automatic machine adapted to be operated by a coin-control to process one fruit at a time at each dropping of a coin in the slot, and delivering the juice from said fruit to the customer without any hands having touched it, it is obvious that the main operations and their controlling mechanisms could be used in a machine which was but partly automatic in operation. Other and further modifications and variations would readily occur to one skilled in this art, and all such modifications and variations as fall within the spirit and scope of the invention in its broad aspects are intended to be included in the combinations and sub-combinations defined in the appended claims.

What is claimed is:

1. In a fruit juice extracting machine, a cabinet for housing the machine, a pair of cup dispensers located at opposite sides of the cabinet each having the usual release levers to release one cup at a time at one operation of a lever, a main frame supporting the machine in the cabinet, a main shaft mounted in said frame, means operating said release levers alternately to release a cup from the dispensers alternately, said means comprising a cam geared to said main shaft, a pair of cam followers engaging said cam, and each held against the cam by a spring, and connections from said cam followers to the respective release levers, the cam having a sudden drop off at which the release levers are actuated to release a cup, and the cam followers being arranged at substantially diametrically opposite points on the cam, whereby a cup is released at each half revolution of the cam, but from the dispensers alternately.

2. In a fruit juice extracting machine, a main frame, cup transfer levers pivoted at opposite sides of the frame, a main shaft mounted in said frame, means for actuating said levers alternately to transfer a cup, said means comprising a cam geared to said main shaft to rotate at half the speed of the main shaft and a pair of cam followers, one associated with each lever.

3. In a fruit juice machine, a closed cabinet housing the machine having a delivery opening in the front wall thereof, a horizontal cup-receiving platform extending across the front inside portion of the cabinet at substantially the level of the bottom of said opening, a cup filling station on said platform located inwardly of said opening, a platform on the same level as said inside platform outside the cabinet, a positively-acting cup push-out for delivering a filled cup from said filling station via said inside platform to said outside platform and operating means therefor, a gate normally closing said opening and operating means therefor, the cup push-out and gate-operating means being timed so as to open the gate just prior to cup delivery to the outside platform and closed immediately after withdrawal of the cup push-out inside the cabinet.

4. In a fruit juice machine, a cabinet housing the machine, a horizontal cup-receiving platform extending across the front inside portion of the cabinet intermediate its height, a pair of cup dispensers located at opposite sides of the machine above said platform, a central filling station forming a part of said platform to which the juice is led for discharge into a cup supported by the platform at said station, means for releasing a cup alternately from said dispensers to drop to the platform, and transfer means engaging the side of a cup and moving it laterally over the platform to alternately transfer a cup from its position under its associated dispenser to the central filling station on the platform.

5. In a fruit juice machine, a cabinet housing the machine, a horizontal cup-receiving platform extending across the front inside portion of the cabinet, a filling station on said platform, a cup dispenser mounted vertically above said platform to one side of said filling station, means for releasing a cup from said dispenser to drop down upon said platform, and transfer means engaging the side of a cup and moving it laterally over said platform from its released position below the dispenser to the filling station.

6. In a fruit juice machine, a closed cabinet having a delivery opening in a wall thereof, a main frame supporting the machine in the cabinet, a vertical cam shaft mounted in said frame, a horizontal platform in the plane of the bottom of said opening and extending from a cup-filling position inside the machine to a position outside the machine at said opening, a positive cup push-out for transferring a filled cup from said filling station through the opening to the outside of the cabinet, and operating means for said push-out including a cam on said shaft, a cam follower engaging said cam, and motion-multiplying connections between said cam follower and said push-out.

7. In a fruit juice machine, a cabinet for housing the machine, a pair of cup dispensers located at opposite sides of the cabinet each having the usual release levers to release one cup at a time at one operation of a lever, a main frame supporting the machine in the cabinet, a main shaft mounted in said frame, and means operating said release levers alternately to release a cup from the dispensers alternately, said means comprising a cam geared to said main shaft, cam followers engaging diametrically opposite points on said cam, and connections from the cam followers to the respective release levers, whereby a cup is released at each half revolution of the cam, but from the dispensers alternately.

WILLIAM A. WEIGHTMAN.
WALTER HURLEMAN.